Figure 1A:
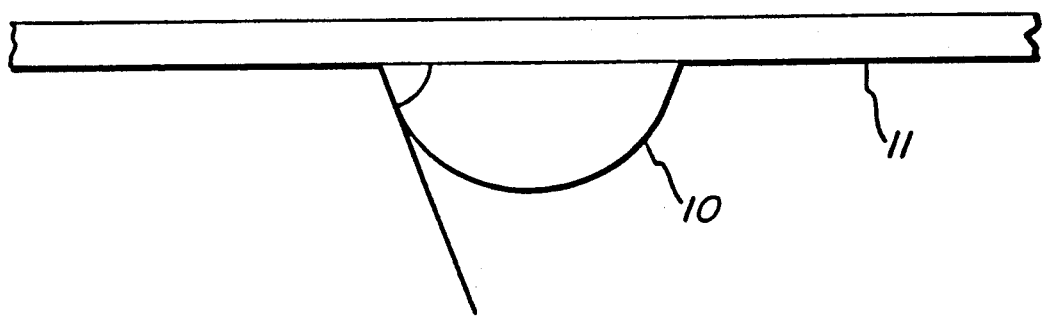

United States Patent [19]

Patel

[11] Patent Number: 5,104,732
[45] Date of Patent: Apr. 14, 1992

[54] THERMOPLASTIC SHEET HAVING ENHANCED WATER WETTING AND SPREADING CHARACTERISTICS

[75] Inventor: Gautam A. Patel, Clifton Park, N.Y.

[73] Assignee: General Electric Company, Schenectady, N.Y.

[21] Appl. No.: 288,597

[22] Filed: Dec. 22, 1988

[51] Int. Cl.⁵ .............................................. B32B 27/36
[52] U.S. Cl. ..................................... 428/331; 428/336; 428/412; 428/413; 428/424.4; 428/425.6; 428/913; 428/918; 428/701
[58] Field of Search ............... 428/412, 413, 331, 913, 428/918, 424.4, 425.6, 336

[56] References Cited

U.S. PATENT DOCUMENTS 4,455,205  6/1984  Olson et al. ................... 204/159.13
4,491,508  1/1985  Olson et al. ................... 204/159.13
4,576,864  3/1986  Krautter et al. .................... 428/328

FOREIGN PATENT DOCUMENTS 49-77407  7/1974  Japan .

*Primary Examiner*—P. C. Sluby
*Attorney, Agent, or Firm*—William A. Teoli; James C. Davis, Jr.; William H. Pittman

[57] ABSTRACT

Thermoplastic sheets are provided such as polymethylmethacrylate sheets and polycarbonate sheets which exhibit improved water wetting and water spreading characteristics. A method for making such articles is also provided which can be employed to make the thermoplastic structured sheets useful in greenhouses and for other roofing and glazing applications such as sun glasses and ski goggles.

8 Claims, 2 Drawing Sheets

THERMOPLASTIC SHEET HAVING ENHANCED WATER WETTING AND SPREADING CHARACTERISTICS

The present invention relates to a method for treating thermoplastic or thermoformable organic substrates, such as polycarbonates, polymethylmethacrylates, and polyesters with a UV curable coating composition and thereafter effecting the cure of the composition on the thermoplastic substrate to impart improved water wetting and spreading characteristics thereto. More particularly, the present invention relates to the employment of a UV curable coating composition having at least 75–85 weight percent colloidal silica based on solids which is used in combination with a polyfunctional acrylate and a photoinitiator.

Prior to the present invention, glazing materials such as polycarbonates and polymethylmethacrylates were often used to make greenhouses requiring thermoplastics having satisfactory light transmission characteristics. It has been found, however, that water vapor condensation on a transparent plastic surface often reduces the light transmissibility of the plastic due to the formation of small discrete droplets. In addition, small droplets often result in the formation of larger droplets due to coalescence resulting in dripping. It has been found that the condensation of water vapor as small water droplets, or haze on the surface of the plastic is mainly due to a high contact angle between water and the plastic surface.

A procedure for reducing the water droplet contact angle allowing for the spreading of water in the form of a uniformly continuous layer thereby effecting an improvement in light transmission and a reduction in water dripping is shown by Krautter et al., U.S. Pat. No. 4,576,864. Krautter et al.'s method involves initially treating the surface of the plastic base by coating it initially with an adhesive consisting of a solution of a non-swellable polar organic polymer, such as a butylmethylmethacrylate mixed with a methylmethacrylate, glycidyl methacrylate and methacrylic acid, in a mixture of isopropyl alcohol and toluene. The treated plastic is then baked and then further treated with an aqueous silicic sol which is then subjected to drying at 80° C. Although the Krautter et al. procedure has been found to enhance the water wetting and spreading characteristics of the treated thermoplastic substrate, it requires a time consuming multi-step procedure.

It would be desirable, therefore, to provide a method for enhancing the water wetting and spreading characteristics of thermoplastic glazing materials, such as polycarbonates and polymethylmethacrylates, in a single-step expeditious manner without the requirement of a multi-step procedure.

The present invention is based on the discovery that a mixture of 1,6-hexanediol diacrylate, 75–85 weight percent colloidal silica based on solids, and a photoinitiator in an isopropanol solvent can be employed to treat various thermoplastic glazing materials, such as polymethylmethacrylates and polycarbonates. The treated substrate can thereafter be cured rapidly at a speed of about 50 feet per minute by exposing it to UV light. Upon curing, the treated substrate exhibits enhanced water spreading characteristics.

STATEMENT OF THE INVENTION

There is provided by the present invention, a substantially transparent thermoplastic sheet having enhanced water wetting and spreading characteristics on at least a portion of its surface as a result of the treatment, followed by UV cure, with a UV-curable mixture comprising, by weight (A) 100 parts of organic solvent (B) 1 to 9 parts of an inorganic oxide-acrylate mixture having a weight ratio of colloidal inorganic oxide to acrylate which has a value in the range of from about 1.9 to 19, and (C) an effective amount of a UV photoinitiator.

Another aspect of the present invention is directed to a thermoplastic structured flat sheet having an upper exterior surface, a bottom exterior surface, and reinforcing cross members in the middle, where at least a portion of the upper exterior surface of the thermoplastic structured flat sheet is treated with a UV-absorbing composition, and at least a portion of the bottom exterior surface of the thermoplastic structured flat sheet is treated with a cured UV-curable mixture having from about 65% to 95% and preferably 75% to about 85% by weight of colloidal inorganic oxide based on solids, which imparts enhanced water wetting and spreading characteristics to such treated surface, where the cured UV-curable water wetting and spreading mixture comprises by weight prior to UV cure, (A) 100 parts of organic solvent (B) 1 to 9 parts of a colloidal inorganic oxideacrylate mixture having a weight ratio of inorganic oxide to acrylate which has a value in the range of from about 1.9 to about 19, and (C) an effective amount of a UV photoinitiator.

In a further aspect of the present invention, there is provided a method for making a substantially transparent thermoplastic sheet having enhanced water wetting and spreading characteristics comprising (1) treating at least a portion of the surface of the thermoplastic sheet with the above-described UV-curable composition, (2) allowing the organic solvent to evaporate at room temperature from the surface of the treated thermoplastic sheet and (3) effecting the UV cure of the coating composition on at least a portion of the surface of the substantially transparent thermoplastic sheet to provide thereon a cured water wetting and spreading coating having from about 75% to 85% by weight of colloidal inorganic oxide based on solids.

Figure 2A:
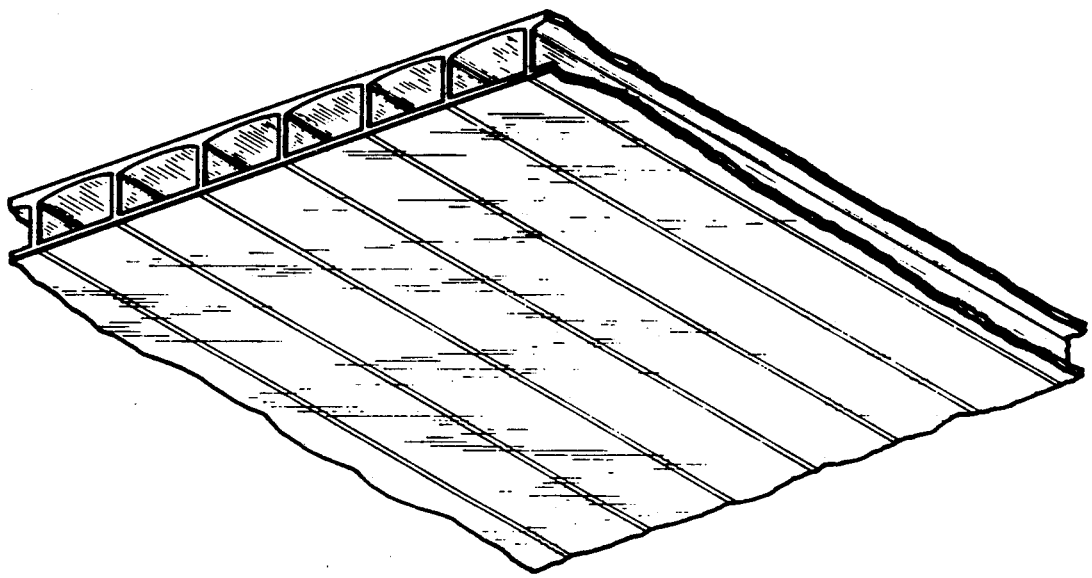

The term "thermoplastic sheet" as used in the description of the present invention, means sheet having a thickness of 1/16" to ½ thick, film having a thickness of 30 mils or less and structured sheet as shown by FIG. 2.

Some of the substantially transparent thermoplastic sheets which can be utilized in the practice of the present invention are, for example, LEXAN polycarbonate, ULTEM polyetherimide, VALOX polyester, which are thermoplastics manufactured by the General Electric Company, Mylar polyester and, in particular instances, polyethylene and polypropylene thermoformable sheet.

Some of the polyfunctional acrylates which can be used in the practice of the present invention are, for example, shown in Olson et al., U.S. Pat. No. 4,491,508, which is incorporated herein by reference. Preferably, diacrylate monomers, such as 1,6-hexanediol diacrylate can be used. Additional acrylate are as follows.

Difunctional Acrylates 1,4 butanediol diacrylate, 1,6 hexanediol diacrylate, 1,3 butylene glycol diacrylate, diethylene glycol diacrylate, neopentylglycol diacrylate, polyethylene glycol diacrylate, triethylene and tripropylene glycol diacrylate, ethoxylated bisphenol A diacrylate, aliphatic urethane acrylate, acrylated silicones.

Multifunctional Monomers trimethylol propane triacrylate
Di-trimethylol propane tetraacrylate
Dipentaerthritol monohydroxypenta acrylate
Pentaerythritol acrylate
Ethoxylated trimethyiol propane triacrylate.

Monofunctional Acrylates

Cyclohexyl acrylate
2-Ethoxyethoxy acrylate
Tetrahydrofurfuryl acrylate
N-Lauryl acrylate
Isodecyl acrylate
Isobornyl acrylate.

Acrylate formulations may consist of various difunctional and multifunctional monomer either alone or in mixtures. Monofunctional acrylate can also be used mainly to reduce or adjust viscosity of the composition.

Another essential ingredient of the UV-curable composition of the present invention is the colloidal inorganic oxide which can include colloidal metal oxides such as alumina, antimony oxide, tin oxide, titanium dioxide, cerium oxide, silica and mixtures thereof. Colloidal silica is preferred having an average diameter of about 4 nm to about 60 nm. Colloidal silica is a dispersion of submicron-size silica ($SiO_2$) particles in an aqueous or other organic solvent medium. Dispersions of colloidal silica are available from chemical manufacturers such as DuPont de Nemours Company and Nalco Chemical Company. Colloidal silica is available in either acidic or basic form. Alkaline colloidal silica may be converted to acidic colloidal silica with acids, such as HCl or $H_2SO_4$ along with high agitation.

An example of a satisfactory colloidal silica for use in these coating compositions is Nalcoag 1034A, available from Nalco Chemical Company, Chicago, Ill. Nalcoag 1034A is a high purity, acidic pH aqueous colloidal silica dispersion having a low $Na_2O$ content, a pH of approximately 3.1 and an $SiO_2$ content of approximately 34 percent by weight in water. Another type of colloidal silica is Ludox AM available from DuPont de Nemours Company, where the colloidal silica surface is modified with aluminum oxide.

Another preferred source of colloidal silica is an organosol available as a 30 wt % $SiO_2$ of 20 nm average diameter in ethylene glycol monopropyl ether solvent from Nalco Chemical Company. This product is designated 8455 258. Organosols can also be prepared in other alcohol or glycol ether type or dimethylformamide solvent. Both organosols and aquasols can be used as a source of colloidal silica in this system.

Organic solvents which can be used in the practice of the present invention as part of the UV-curable mixture include, for example, isopropanol, isobutanol, n-butanol, n-propanol or glycol ethers.

UV initiators include ketones, benzoin ethers and quinones. For example, ketone-type photoinitiators which can be used in a non-oxidizing atmosphere, such as nitrogen are, for example, benzophenone, and other acetophenones, benzyl, benzaldehyde, o-chlorobenzaldehyde, thioxanthone, 2-chlorothioxanthone, 9-10-phenanthrenequinone, 9,10-anthraquinone, methylbenzoin ether, ethylbenzoin ether, isopropyl benzoin ether, $\alpha,\alpha$-diethoxyacetophenone, $\alpha,\alpha$-dimethoxyacetophenone, 1-phenyl-1,2-propanediol-2-o-benzoyl oxime, and $\alpha,\alpha$-dimethoxy-$\alpha$-phenylacetophenone.

A BRIEF DESCRIPTION OF THE DRAWING

In order that those skilled in the art will be better able to practice the present invention, reference is made to the drawings. There is shown at FIG. 1 side views at 1(a), 1(b) and 1(c) of a thermoformable or plastic substrate having a water droplet on its surface at various contact angles. In FIG. 2 there is shown an isometric view of a typical structured plastic sheet and a side view.

Figure 1B:
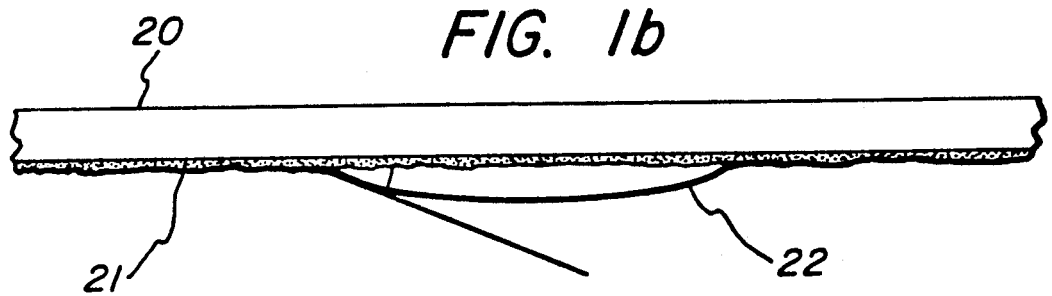
Figure 1C:
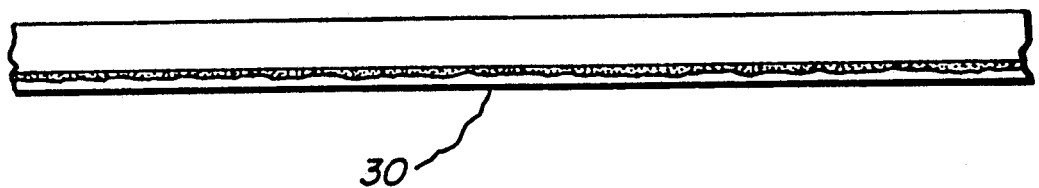
Figure 2B:
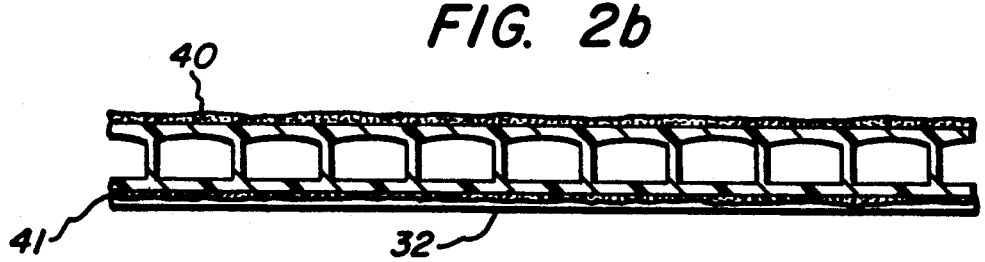

More particularly, there is shown at FIG. 1(a) a water droplet at 10 on an untreated plastic sheet at 11. The droplet exhibits a high contact angle. In FIG. 1(b) there is shown a plastic substrate at 20 coated with a cured inorganic oxide-acrylate coating at 21 having a thickness of from about 0.1 to 1 micron in accordance with the practice of the invention, and a water droplet at a low contact angle at 22. In FIG. 1(c) there is shown a water droplet at 30 which on a treated plastic substrate which has spread completely. FIG. 2b shows a UV-cured absorbing layer at 40, an inorganic oxide-acrylate coating at 41 and a water layer at 32.

An effective amount of the UV initiator is 1% to 10% by weight based on the weight of the UV-curable composition.

Similar water spreading coatings can be made with epoxy resins and colloidal inorganic oxide and onium salt photoinitiators. There can be used onium salts such as diphenylsulfonium fluoroantimonate salts, triphenylsulfonium hexafluorophosphate salts and triphenylsulfonium hexafluoroarsenate salts. In addition, there also can be used diaryliodonium salts, such as diphenylfluoroantimonate salts or diphenylhexafluorophosphate salts. These catalysts can be used at from 0.1% to 15% by weight based on weight of curable mixtures.

In the practice of the method of the present invention, a thermoplastic substrate is treated with the UV-curable composition which is allowed to air dry and then subjected to sufficient UV irradiation to effect the cure of the coating having a thickness of 0.1 to 1 microns, and preferably 0.2 to 0.5 microns. Treatment of the thermoplastic substrate can be achieved by spraying, roll coating or dipping the substrate into the UV-curable mixture. In instances where it is desired to treat the thermoplastic substrate to provide UV protection on the upper surface, a typical UV absorber such as 4-octoxy-2-hydroxybenzophenone can be surface impregnated with an organic solvent, or it can be applied as part of a heat curable coating. However, in instances where a latent UV absorber is applied, such as shown by Olson, U.S. Pat. No. 4,343,830, utilizing a sulfonate ester of a hydroxy-benzotriazole, a simultaneous UV cure of both upper and lower surfaces can be effected. For example, a glazing material such as a Lexan polycarbonate sheet, which can be structured, can be passed continuously between UV lamps after being treated simultaneously by spraying or roll coating with the respective UV protecting and water spreading UV-curable mixtures.

Cure of the UV-curable compositions containing either the UV absorber or the UV-curable compositions convertible to the moisture spreading cured coating can be achieved by using UV irradiation having a wavelength of from about 1849 angstroms to 4000 angstrom in an inert atmosphere such as nitrogen. The lamps systems used to generate such irradiation can consist of ultraviolet lamps, such as from 1 to 50 discharge lamps, such as xenon, metallic halide, metallic arc such as a low, medium or high pressure mercury vapor discharge lamp having an operating pressure of from a few mil torr to about 10 atmospheres, etc. can be employed. The lamp envelopes can consist of quartz such as spectracil or pyrex, etc. Typical lamps which can be used are, for example, ultraviolet medium pressure arc lamps such as GEH3T7, etc. When using UV lamps, the irradiation flux in the substrate can be at least 0.01 watt per square inch to effectively cure the organic resin within 1 to 20 seconds.

It has been found that the cured coating of colloidal silica and acrylate as previously defined can contain from 65 to 95 weight % silica based on solids. It has been found that a contact angle of 20° or less requires greater than 80 weight % silica.

In order that those skilled in the art will be better able to practice the present invention, the following example is given by way of illustration and not by way of limitation. All parts are by weight.

UV-curable coating compositions A, B and C containing 85, 81.5 and 75 weight percent colloidal silica, respectively, were prepared by mixing 1,6-hexanediol diacrylate, colloidal silica and a photoinitiator in isopropanol. Colloidal silica organosol was a 30 weight percent SiO2 of 20 nanometer average diameter in ethyleneglycol monopropylether solvent which was obtained from Nalco Chemical Company of Oak Brook, Ill. There was used DAROCUR 1173 as the photoinitiator which is 2-hydroxy-2-methyl-1-phenyl-propane-1-one. It is manufactured by EM Industries, Inc. of Hawthorne, N.Y.

Compositions A, B and C were flow-coated on a Lexan polycarbonate 6"×12"×⅛ sheet and the isopropanol solvent was allowed to flash at room temperature for 3 to 4 minutes. The treated sheet was then cured by exposing to UV irradiation. Curing was accomplished in a PPG model QC1202 UV processor employing two 10 inch long, 300 watt/in. medium pressure mercury lamps at a belt speed of 50 ft./min. under a nitrogen atmosphere. The cured coating prepared using composition A was 0.35 micron thick.

The following table shows the results obtained and the respective compositions.

| Coating Compositions and Coating Properties | | | |
|---|---|---|---|
| | A | B | C |
| Isopropanol (gms) | 100 | 100 | 100 |
| 1,6-Hexanediol diacrylate (6 PHS in isopropanol) (gms) | 9.0 | 9.0 | 9.0 |
| 30 Wt % colloidal silica, 84SS258 (gms) | 9.0 | 7.5 | 5.0 |
| DAROCUR ™ 1173 (1 PHS in isopropanol) (gms) | 6.0 | 8.0 | 8.0 |
| Weight % silica based on solids | 85 | 81.5 | 75 |
| Initial contact angle of water, $\phi$°[2] | 10 | 15 | 27 |
| Initial tape adhesion[3] | Pass | Pass | Pass |
| Contact angle of water after 14 days of water immersion at 149° F., $\phi$° | 11 | 20 | 19 |
| Tape adhesion[3] after 14 days of water immersion at 149° F. | Pass | Pass | Pass |

[1]Parts by weight per hundred solvent.
[2]Contact angle of uncoated Lexan surface 75°.
[3]Tape adhesion checked by adhering 3M-610 tape to coating and pulling it. The coating washed with isopropanol and water and $\phi$ measured again. Substantial increase in $\phi$ indicated loss of coating or poor adhesion.

The above results show that initial contact angles, 10°, 15° and 27°, were obtained with sheet treated with the curable composition of the present invention while untreated polycarbonate sheet had a contact angle of 75°. All coatings exhibited excellent water wetting and spreading properties and passed a Scotch tape adhesion test. The contact angle measurements of the above table were performed with a Rame Heart Inc. NRL Contact Angle Goniometer. The adhesion test was performed by applying Scotch tape onto the surface of the coating and then removing the Scotch tape to determine whether there was a cohesive or adhesive release. In all instances, there was an adhesive release indicating no separation of the coating from the surface of the treated substrate occurred.

Although the above results are directed to only a few of the very many variables which can be used in the practice of the present invention, it should be understood that the present invention is directed to the use of a much broader variety of thermoformable substrates, resins, UV photoinitiators and solvents as set forth in the description preceding this example.

What is claimed is:

1. A substantially transparent thermoplastic sheet or film having enhanced water wetting and spreading characteristics on at least a portion of its surface as a result of applying a UV curable mixture to at least a portion of the surface of the substantially transparent thermoplastic sheet or film, followed by the UV cure of the UV-curable mixture which comprises by weight,
    (A) 100 parts of organic solvent
    (B) 1 to 9 parts of a colloidal inorganic oxideacrylate mixture having a weight ratio of colloidal inorganic oxide to acrylate which has a value in the range of from about 1.9 to 19, and
    (C) an effective amount of a UV photoinitiator.

2. A substantially transparent thermoplastic sheet having an upper exterior surface, a bottom exterior surface, and reinforcing cross members in the middle, in accordance with claim 1.

3. A substantially transparent polycarbonate sheet in accordance with claim 1.

4. A substantially transparent polymethylmethacrylate sheet in accordance with claim 1.

5. A substantially transparent thermoplastic sheet in accordance with claim 1 wherein the inorganic oxide is silica having a weight % based on weight of solids of the cured coating of at least 80.

6. A substantially transparent thermoplastic sheet in accordance with claim 1 having an inorganic oxide-acrylate coating with a thickness of about 0.1 micron to about 1 micron.

7. A substantially transparent thermoplastic sheet or film in accordance with claim 1 where the acrylate in the inorganic oxide-acrylate mixture is selected from the class consisting of multi-functional acrylates, multi-functional methacrylates, acrylated urethanes, acrylated bisphenol A and acrylated silicones.

8. A substantially transparent thermoplastic sheet in accordance with claim 1 coated with a UV-cured epoxy resin catalyzed with an onium salt.

* * * * *